United States Patent
Falkner et al.

(10) Patent No.: US 7,549,174 B1
(45) Date of Patent: Jun. 16, 2009

(54) MULTI-FILE CRYPTOGRAPHIC KEYSTORE

(75) Inventors: James H. Falkner, Altamonte Springs, FL (US); Darren J. Moffat, Campbell, CA (US); Paul J. Sangster, San Jose, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 878 days.

(21) Appl. No.: 10/900,229

(22) Filed: Jul. 27, 2004

(51) Int. Cl.
  *G06F 21/20* (2006.01)
  *G06F 21/22* (2006.01)
  *G06F 12/14* (2006.01)
(52) U.S. Cl. .................. 726/29; 726/6; 726/7; 726/18; 726/19; 726/30; 713/100; 713/189; 713/191; 713/193; 380/277; 380/278; 380/45
(58) Field of Classification Search ............. 726/29
  See application file for complete search history.

(56) References Cited

U.S. PATENT DOCUMENTS

| 6,986,052 B1* | 1/2006 | Mittal ................. 713/190 |
| 7,036,020 B2* | 4/2006 | Thibadeau ........... 713/193 |
| 2003/0023867 A1* | 1/2003 | Thibadeau ........... 713/200 |

OTHER PUBLICATIONS

Weaver, C., et al, 'Application Specific Architectures: A Recipe for Fast, Flexible and Power Efficient Designs', CASES'01, Nov. 16-17, 2001, ACM 1-58113-399-5/01/0011, entire document, http://www.eecs.umich.edu/~taustin/papers/CASES02-asp.pdf.*

* cited by examiner

*Primary Examiner*—Kambiz Zand
*Assistant Examiner*—Ronald Baum
(74) *Attorney, Agent, or Firm*—Osha • Liang LLP

(57) ABSTRACT

A system including an application configured to request a key, a keystore configured to provide the key, wherein the keystore comprises a non-application specific directory, and an application-specific subdirectory.

17 Claims, 4 Drawing Sheets

MULTI-FILE CRYPTOGRAPHIC KEYSTORE

BACKGROUND

As reliance has computers has increased, so has the concern for the computer security. The threat of hackers breaking into computer systems or eavesdropping on communications has prompted many corporations and individuals to implement security strategies. Some of these strategies include encrypting data communication using Secure Socket Layer (SSL) protocol and signing digital documents with digital signatures. The aforementioned security mechanisms require encryption keys (i.e., public and private encryption keys) as well as certificates to authenticate the encryption keys.

Depending on the computer system configuration (e.g., the number of users, the number and types of applications, the level of security, etc.) the computer system may store a number of encryption keys and a number of corresponding certificates. The encryption keys and corresponding certificates are typically stored in a central location, commonly referred to a keystore. In many cases, the keystore is a single file containing all the encryption keys and corresponding certifications for the computer system. Further, the keystore may also be password protected as an extra security precaution.

When an application (or process) requires an encryption key, the application sends a request to the keystore. The entire keystore is subsequently retrieved and queried to obtain the particular encryption key. The first matching encryption key is subsequently returned to the application. Prior to returning the encryption key to the application, the keystore may authenticate the encryption key using the corresponding certificates. Typically, only one application may access the keystore at a time because the keystore is a single file.

SUMMARY

In general, in one aspect the invention relates to a system comprising an application configured to request a key, a keystore configured to provide the key, wherein the keystore comprises a non-application specific directory, and an application-specific subdirectory.

In general, in one aspect, the invention relates to a method for obtaining a key from a keystore, comprising receiving a request for the key from an application, searching for the key in a secure area of an application-specific subdirectory of the keystore, determining whether the application has permission to retrieve the key from the secure area of the application-specific subdirectory, if the key is found in the secure area of the application-specific subdirectory, retrieving the key from the secure area application-specific subdirectory, if the application has permission to retrieve the key from the secure area of the application-specific subdirectory, searching for the key in a non-secure area of an application-specific subdirectory, if the key is not found in the secure area of the application-specific subdirectory, retrieving the key from the non-secure area of the application-specific subdirectory, if the key is found in the non-secure area of the application-specific subdirectory, searching for the key in a secure area of a non-application specific directory, if the key is not found in the non-secure area of the application-specific directory, determining whether the application has permission to retrieve the key from the secure area of the non-application specific directory, if the key is found in the secure area of the non-application specific directory, retrieving the key from the secure area of the non-application specific directory, if the application has permission to retrieve the key from the secure area of the non-application specific directory, searching for the key in a non-secure area of the non-application specific directory, if the key is not found in the secure area of the non-application specific directory, and retrieving the key from the non-secure area of the non-application specific directory, if the key is found in the non-secure area of the non-application specific directory.

In general, in one aspect, the invention relates to a plurality of nodes, comprising an application configured to request a key, a keystore configured to provide the key, wherein the keystore comprises a non-application specific directory, and an application-specific subdirectory, wherein the application is executing on at least one of the plurality of nodes, and wherein the keystore is executing on at least one of the plurality of nodes.

In general, in one aspect, the invention relates to a computer for obtaining a key from a keystore, comprising a processor, memory, a storage device, and software instructions stored in the memory for enabling the computer system under control of the processor, to: receive a request for the key from an application, search for the key in a secure area of an application-specific subdirectory of the keystore, determine whether the application has permission to retrieve the key from the secure area of the application-specific subdirectory, if the key is found in the secure area of the application-specific subdirectory, retrieve the key from the secure area application-specific subdirectory, if the application has permission to retrieve the key from the secure area of the application-specific subdirectory, search for the key in a non-secure area of an application-specific subdirectory, if the key is not found in the secure area of the application-specific subdirectory, retrieve the key from the non-secure area of the application-specific subdirectory, if the key is found in the non-secure area of the application-specific subdirectory, search for the key in a secure area of a non-application specific directory, if the key is not found in the non-secure area of the application-specific directory, determine whether the application has permission to retrieve the key from the secure area of the non-application specific directory, if the key is found in the secure area of the non-application specific directory, retrieve the key from the secure area of the non-application specific directory, if the application has permission to retrieve the key from the secure area of the non-application specific directory, search for the key in a non-secure area of the non-application specific directory, if the key is not found in the secure area of the non-application specific directory, and retrieve the key from the non-secure area of the non-application specific directory, if the key is found in the non-secure area of the non-application specific directory.

Other aspects of the invention will be apparent from the following description and the appended claims.

DETAILED DESCRIPTION

Figure 1:
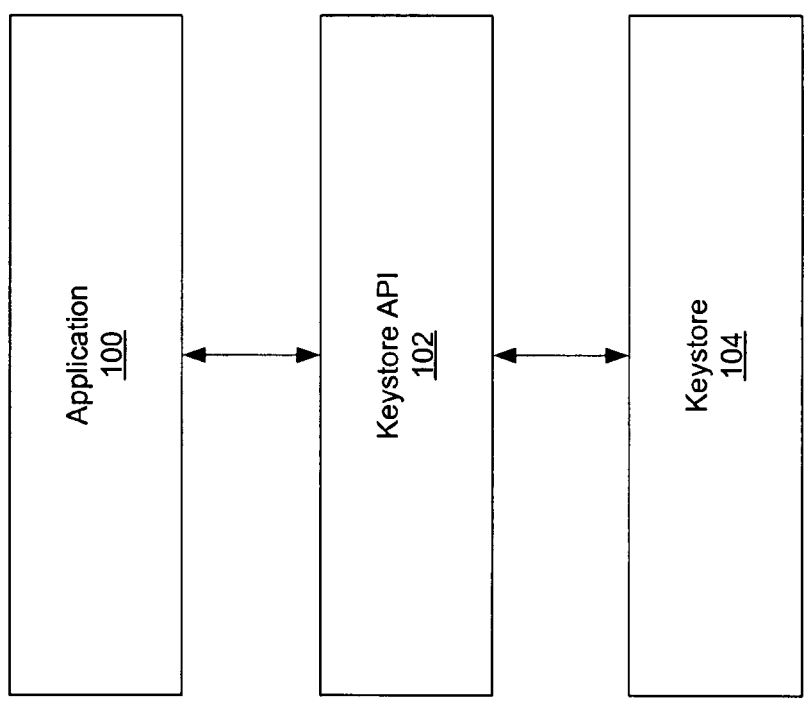
FIG. 1 shows a flow diagram in accordance with one embodiment of the invention.

Exemplary embodiments of the invention will be described with reference to the accompanying drawings. Like items in the drawings are shown with the same reference numbers.

In an embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention, relate to a method and apparatus for a multi-file cryptographic keystore. More specifically, one or more embodiments for the invention provide a method and apparatus for configuring a multi-file cryptographic keystore. Further, one or embodiments of the invention provide a multi-file cryptographic keystore including non-application specific directories and application-specific subdirectories. Further, one or more embodiments of the invention provide a multi-file cryptographic keystore in which each directory and subdirectory includes secure and non-secures areas. Further, one or more embodiments of the invention provide a method and apparatus for allowing multiple applications (or processes) to access the multi-file cryptographic keystore simultaneously. Further, one or more embodiments of the invention provide a method and apparatus for isolating individual files within the multi-file cryptographic keystore. Further, one or more embodiments of the invention provide a method and apparatus allowing administrators to configure the multi-file cryptographic keystore at various levels of granularity.

FIG. 1 shows a flow diagram of a system including a keystore in accordance with one embodiment of the invention. Specifically, the system includes an application (100) interfacing with a keystore Application Programming Interface (API) (102). The keystore API (102) in turn interfaces with a keystore (104). In one embodiment of the invention, the application (100) includes functionality to request an encryption key (hereinafter "key") from the keystore (104) via the keystore API (102). In one embodiment of the invention, the request for the key may include the name of the key (or another means of identifying the key) and, in some instances, the name of the requesting application (or process). Further, if the particular key that the application is requesting is protected, for example by a password, the password to access the key may also be included within the request. Those skilled in the art will appreciate that password may be associated with a particular application or with a user of the application.

The request is forwarded from the application (100) to the keystore API (102). In one embodiment of the invention, the keystore API (102) includes functionality to interface the application (100) and the keystore (104). More specifically, in one embodiment of the invention, the keystore API (102) includes functionality to publish the various interfaces necessary for the application (100) to access the keystore (104). The request is subsequently forwarded to the keystore (104). In one embodiment of the invention, the keystore (104) may include functionality to receive the request, search for the key, determine whether the application (100) has permission to retrieve the key (e.g., by verifying the password), obtain certificates related to the key, forward the key to the requesting application (100) (via the keystore API (102)), etc. Further, the keystore (104) may include functionality to allow multiple applications to access the keystore (104) simultaneously. An embodiment of the keystore (104) is shown in FIG. 2.

Figure 2:
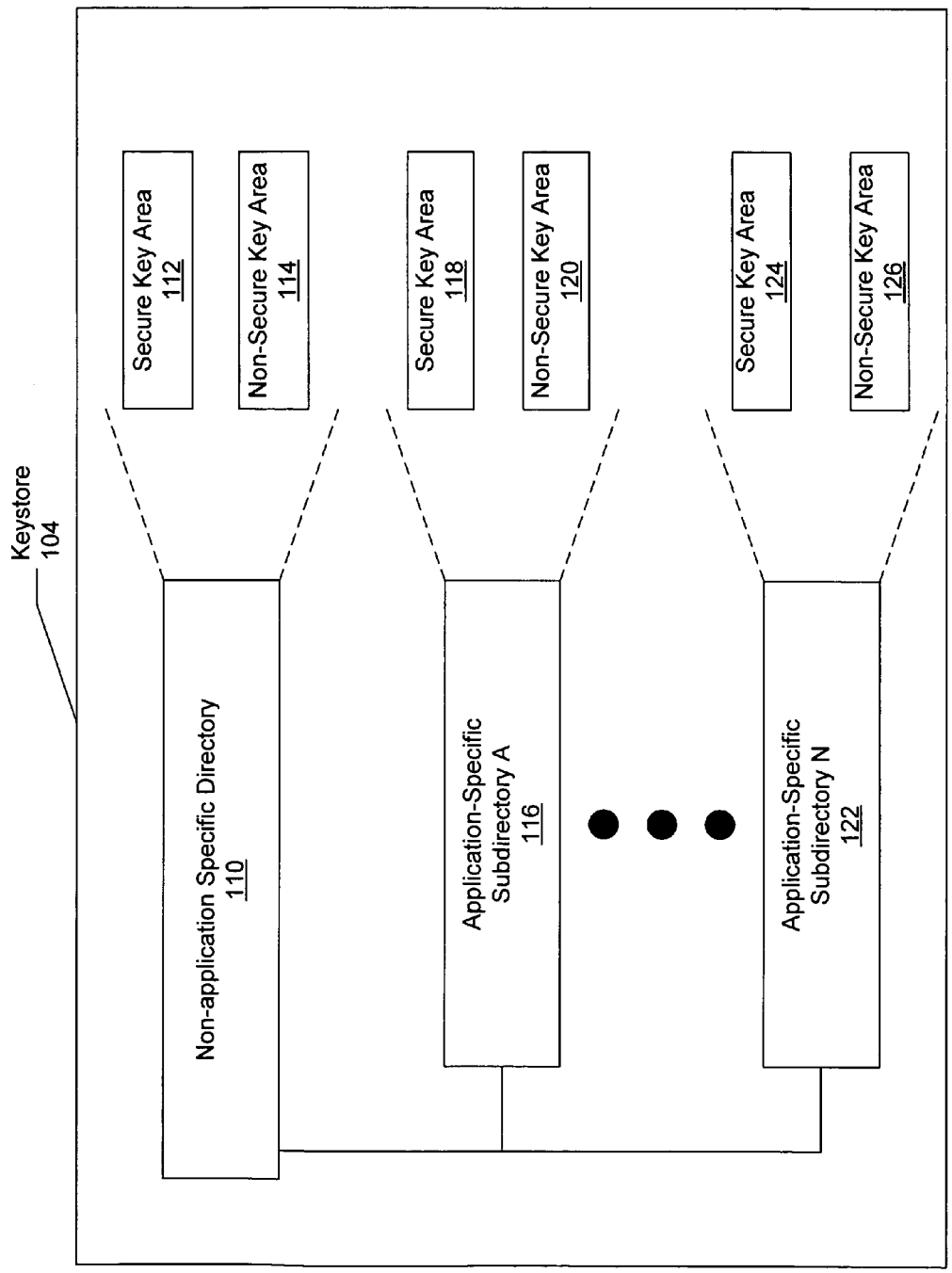
FIG. 2 shows a keystore in accordance with one embodiment of the invention.

FIG. 2 shows a keystore in accordance with one embodiment of the invention. In one embodiment of the invention, the keystore (104) is organized as a directory. In one embodiment of the invention, the top-level directory may correspond to a non-application specific directory (110). The non-application specific directory (110) may include keys (and corresponding certificates), for example, that are not related to any specific application or are used by more than one application. Further, the non-application specific directory (110) may also hold per-application user keys (and corresponding certificates) depending on the granularity of the security measures used by the application and/or system on which the application is executing.

The keystore (104) may also include a number of application-specific subdirectories (i.e., application-specific subdirectory A (116) and application-specific subdirectory N (122)). The application-specific subdirectories (i.e., application-specific subdirectory A (116) and application-specific subdirectory N (122)) typically include keys (and corresponding certificates) that are associated with a particular application. Further, the application-specific subdirectories (i.e., application-specific subdirectory A (116) and application-specific subdirectory N (122)) may also hold per-application user keys (and corresponding certificates) depending on the granularity of the security measures used by the application and/or system on which the application is executing.

The non-application specific directory (110) and each of the non-application specific subdirectories (i.e., application-specific subdirectory A (116) and application-specific subdirectory N (122)) may be further subdivided into a secure key area and a non-secure key area. Thus, non-application specific directory (110) includes secure area (112) and non-secure area (114). Further, application-specific subdirectory A (116) includes secure key area (118) and non-secure key area (120), and application-specific subdirectory N (122) includes secure key area (118) and non-secure key area (120). Though not shown in FIG. 2, the secure and non-secure areas within a given directory or subdirectory may be stored as a single file. For example, the secure and non-secure areas may be stored as a single file using the Personal Information Exchange Syntax Standard (PKCS#12).

In general, keys and certificates stored in the secure key area of the respective directory or subdirectory are password protected or otherwise protected in a manner which requires the keystore (or a related process) to verify that the application (or process) requesting the key has sufficient privileges to access the key (and corresponding certificates). In one embodiment of the invention, the keys (and corresponding certificates) are stored in encrypted form and may only be decrypted if the requesting application has permission to retrieve the key (and corresponding certificates) as determined by the keystore (or a related process). Further, in one embodiment of the invention, each of the keys (and corresponding certificates) may be encrypted using a different encryption key and/or may be protected using a different password. In contrast, the keys and certificates stored in the non-secure key area of the respective directory or subdirectories are typically not password protected and may be retrieved for use by any requesting application without requiring any verification of the requesting application.

Figure 3:
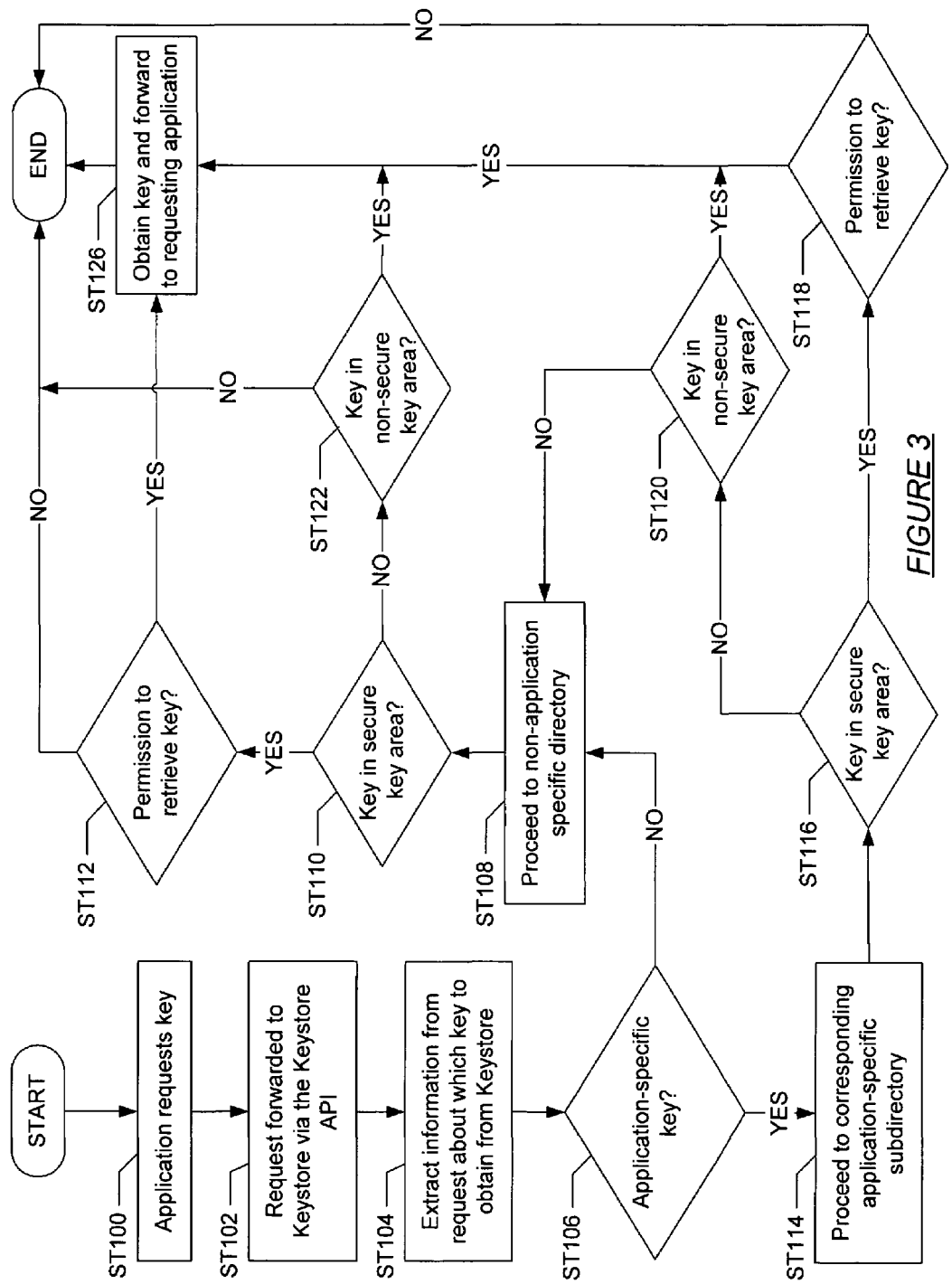
FIG. 3 shows a flow chart in accordance with one embodiment of the invention.

FIG. 3 shows a flow chart of a process using the keystore in accordance with one embodiment of the invention. Initially, an application (or a related process) requests a key (ST100). The request is forwarded from the application (or related process) to the keystore via the keystore API (ST102). Information about which key to obtain from the keystore is subsequently extracted from the request (ST104). Those skilled in the art will appreciate that the requesting application includes sufficient knowledge about the information needed to retrieve the particular key that is being requested and provides this information in the request.

Continuing with the discussion of FIG. 3, once the information about the key has been extracted from the request, a determination is then made as to whether the requested key is an application-specific key (ST106). In one embodiment of the invention, this determination may be made by comparing the name of the requesting application with the available application-specific subdirectories. If the name of the requesting application has a corresponding application-specific subdirectory, then the requested key may be considered an application-specific key. Those skilled in the art will art will appreciate that a first application may request an application-specific key corresponding to second application, in which case ST106 corresponds to determining whether there is a application-specific subdirectory for the second application (even though the first application is requesting the key).

Those skilled in the art will appreciate that ST106 is conducted to increase the efficiency of the search for the key. Specifically, if the requesting application does not have a corresponding application-specific subdirectory, then the keystore need not waste resources by searching in any of the application-specific directories. However, those skilled in the art will appreciate implementations may exist in which application-specific directories are searched regardless of whether or not the key is considered to be an application-specific key.

Continuing with the discussion of FIG. 3, if the key is an application-specific key (ST106), then the keystore proceeds to the corresponding application-specific subdirectory (i.e., the application-specific subdirectory corresponding the requesting application) (ST114). Within the application-specific subdirectory, the keystore initially searches the secure area of the application-specific subdirectory to determine whether the requested key is present (ST116). If the requested key is present in the secure area, then the keystore proceeds to determine whether the requesting application has permission to retrieve the key (ST118). In one embodiment of the invention, the permission is determined by comparing a password supplied by the requesting application to the password stored in the keystore. Those skilled in the art will appreciate that any method of verification may be used to determine that the requesting application (or process) has permission to access the key.

If the keystore (or a related process) determines that the requesting application has the necessary permission to retrieve the requested key, the keystore proceeds to retrieve the key and forward the key to the requesting application (ST 126). In one embodiment of the invention, retrieving the key may include decrypting the key. Alternatively, if the key is not stored in encrypted form, then the key is retrieved from the keystore and forwarded to the requesting application. If the keystore determines that the requesting application does not have sufficient privileges, then the operation fails and/or the user/application is notified accordingly (not shown).

If the key is not in the secure area of the application-specific subdirectory (ST116), then the non-secure area in the application-specific subdirectory is searched by the keystore (ST120). If the key is found in the non-secure area of the application-specific subdirectory, then the key is retrieved from the keystore and forwarded to the requesting application (ST126).

Continuing with the discussion of FIG. 3, if the key is not located in the application-specific subdirectory or the key is not an application-specific key (ST106), then the keystore proceeds to the non-application specific directory (ST108). Those skilled in the art will appreciate that all application-specific directories are not searched; rather only the one that corresponds the particular requesting application is searched. The keystore then proceeds to search for the key in the secure-area of the non-application specific directory (ST110). If the requested key is present in the secure area of the non-application specific directory, then the keystore proceeds to determine whether the requesting application has permission to retrieve the key (ST 112). If the keystore (or a related process) determines that the requesting application has the necessary permission to retrieve the requested key, the keystore proceeds to retrieve and forward the key to the requesting application (ST 126). If the keystore determines that the requesting application does not have sufficient privileges, then the operation fails and/or the user/application is notified accordingly (not shown).

If the key is not in the secure area of the non-application specific directory (ST110), then the non-secure area in the non-application specific directory is searched by the keystore (ST122). If the key is found in the non-secure area of the non-application specific directory, then the key is retrieved from the keystore and forwarded to the requesting application (ST126). Alternatively, if the request key is not found in the non-application specific directory, then the operation fails and/or the user/application is notified accordingly (not shown).

Those skilled in the art will appreciate that multiple copies of a given key (and corresponding certificates) may be present in the keystore. However, the keystore only returns the first requested key that is encountered during the search. Further, those skilled in the art will appreciate the while the invention was described with respect to embodiment of the keystore shown in FIG. 2, there may be alternate hierarchical configurations of the keystore that have the same properties as the hierarchical configuration shown in FIG. 2.

Figure 4:
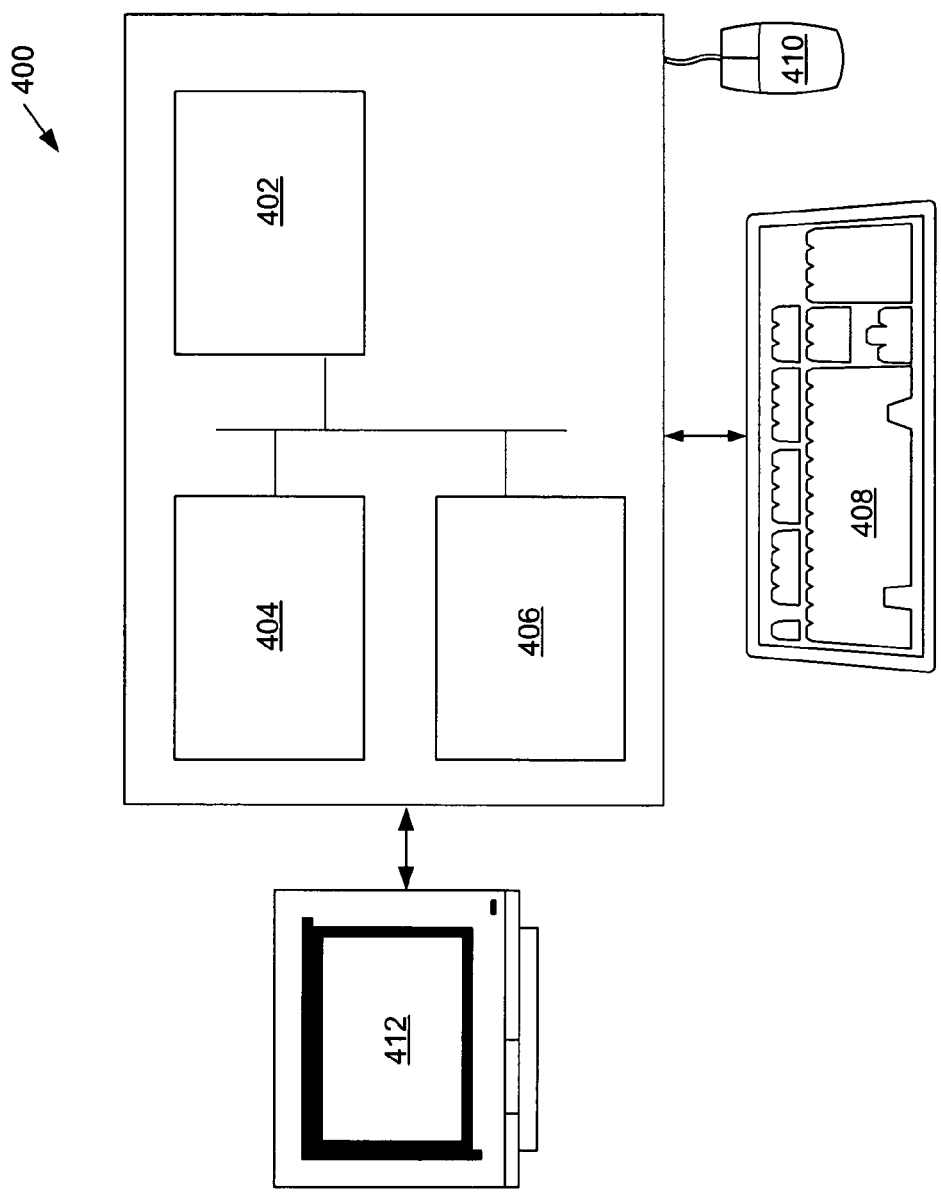
FIG. 4 shows a computer system in accordance with one embodiment of the invention.

The invention may be implemented on virtually any type of computer regardless of the platform being used. For example, as shown in FIG. 4, a computer system (400) includes a processor (402), associated memory (404), a storage device (406), and numerous other elements and functionalities typical of today's computers (not shown). The computer system (400) may also include input means, such as a keyboard (408) and a mouse (410), and output means, such as a monitor (412). The computer system (400) may be connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (400) may be located at a remote location and connected to the other elements over a network.

Further, the invention may be implemented on a distributed system having a plurality of nodes, where each portion of the invention (e.g., the application keystore, etc.) may be located on a different node within the distributed system. In one embodiment of the invention, the node corresponds to a computer system. Alternatively, the node may correspond to a processor with associated physical memory.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
 a processor, wherein the processor is configured to execute an application arranged to request a key, wherein the application is one of a plurality of applications;

a storage device; and
a keystore stored on the storage device and configured to provide the key, wherein the keystore comprises:
- a non-application specific directory configured to store non-application keys and non-application certificates, wherein each of the non-application keys and each of the non-application certificates are associated with at least two applications of the plurality of applications; and
- an application-specific subdirectory configured to store application keys and application certificates, wherein the application-specific subdirectory is a subdirectory of the non-application specific directory, and wherein each of the application keys and each of the application certificates are specific to the application,
- wherein the non-application specific directory comprises a secure key area and a non-secure key area,
- wherein the application-specific subdirectory comprises a secure key area and a non-secure key area, and
- wherein the keystore is configured to query the secure area of the application-specific subdirectory for the key and then query the non-secure area of the application-specific subdirectory for the key, if the key is not found in the secure area of the application-specific subdirectory.

2. The system of claim 1, wherein the system further comprises:
a keystore application programming interface (API) configured to provide an interface between the keystore and the application.

3. The system of claim 1, wherein the non-application specific directory comprises a secure key area and a non-secure key area.

4. The system of claim 3, wherein at least one key in the secure key area is password protected.

5. The system of claim 1, wherein the application-specific subdirectory comprises a secure key area and a non-secure key area.

6. The system of claim 5, wherein at least one key in the secure key area is password protected.

7. The system of claim 1, wherein the application is configured to request the key using an application name.

8. The system of claim 1, wherein the keystore is configured to first query the application-specific subdirectory for the key and then query the non-application specific directory for the key, if the key is not found in the application-specific subdirectory.

9. The system of claim 1, wherein the keystore is configured to store at least one key.

10. The system of claim 9, wherein the keystore is configured to store at least one certificate associated with the at least one key.

11. The system of claim 1, wherein the keystore is configured to return a matching key from the keystore.

12. A method for obtaining a key from a keystore, comprising:
receiving a request for the key from an application of a plurality of applications;
searching for the key in a secure area of an application-specific subdirectory of the keystore, wherein the application-specific subdirectory is a subdirectory of a non-application specific directory and is configured to store application keys and application certificates, wherein each of the application keys and each of the application certificates are specific to the application;
determining whether the application has permission to retrieve the key from the secure area of the application-specific subdirectory, if the key is found in the secure area of the application-specific subdirectory;
retrieving the key from the secure area application-specific subdirectory, if the application has permission to retrieve the key from the secure area of the application-specific subdirectory;
searching for the key in a non-secure area of an application-specific subdirectory, if the key is not found in the secure area of the application-specific subdirectory;
retrieving the key from the non-secure area of the application-specific subdirectory, if the key is found in the non-secure area of the application-specific subdirectory;
searching for the key in a secure area of the non-application specific directory, if the key is not found in the non-secure area of the application-specific directory, wherein the non-application specific director is configured to store non-application keys and non-application certificates, wherein each of the non-application keys and each of the non-application certificates are associated with at least two applications of the plurality of applications;
determining whether the application has permission to retrieve the key from the secure area of the non-application specific directory, if the key is found in the secure area of the non-application specific directory;
retrieving the key from the secure area of the non-application specific directory, if the application has permission to retrieve the key from the secure area of the non-application specific directory;
searching for the key in a non-secure area of the non-application specific directory, if the key is not found in the secure area of the non-application specific directory; and
retrieving the key from the non-secure area of the non-application specific directory, if the key is found in the non-secure area of the non-application specific directory.

13. The method of claim 12, wherein the keystore is configured to store at least one key.

14. The method of claim 13, wherein the keystore is configured to store at least one certificate associated with the at least one key.

15. A plurality of nodes, comprising:
a processor, wherein the processor configured to execute an application arranged to request a key, wherein the application is one of a plurality of applications;
a storage device; and
a keystore stored on the storage device and configured to provide the key, wherein the keystore comprises:
- a non-application specific directory configured to store non-application keys and non-application certificates, wherein each of the non-application keys and each of the non-application certificates are associated with at least two applications of the plurality of applications; and
- an application-specific subdirectory configured to store application keys and application certificates, wherein the application-specific subdirectory is a subdirectory of the non-application specific directory, and wherein each of the application keys and each of the application certificates are specific to the application,
- wherein the non-application specific directory comprises a secure key area and a non-secure key area,
- wherein the application-specific subdirectory comprises a secure key area and a non-secure key area, and
- wherein the keystore is configured to query the secure area of the application-specific subdirectory for the key, and then query the non-secure area of the application-specific subdirectory for the key, if the key is not found in the secure area of the application-specific subdirectory, wherein the application is executing on at least one of the plurality of nodes, and wherein the keystore is executing on at least one of the plurality of nodes.

16. The plurality of nodes of claim 15, further comprises:

a keystore application programming interface (API) configured to provide an interface between the keystore and the application, wherein the keystore application is executing on at least one of the plurality of nodes.

17. A computer system for obtaining a key from a keystore, comprising:

a processor;

a memory;

a storage device configured to store the keystore; and software instructions stored in the memory for enabling the computer system under control of the processor, to:

receive a request for the key from an application of a plurality of applications;

search for the key in a secure area of an application-specific subdirectory of the keystore, wherein the application-specific subdirectory is a subdirectory of a non-application specific directory and is configured to store application keys and application certificates, wherein each of the application keys and each of the application certificates are specific to the application;

determine whether the application has permission to retrieve the key from the secure area of the application-specific subdirectory, if the key is found in the secure area of the application-specific subdirectory;

retrieve the key from the secure area application-specific subdirectory, if the application has permission to retrieve the key from the secure area of the application-specific subdirectory;

search for the key in a non-secure area of an application-specific subdirectory, if the key is not found in the secure area of the application-specific subdirectory;

retrieve the key from the non-secure area of the application-specific subdirectory, if the key is found in the non-secure area of the application-specific subdirectory;

search for the key in a secure area of the non-application specific directory, if the key is not found in the non-secure area of the application-specific directory, wherein the non-application specific director is configured to store non-application keys and non-application certificates, wherein each of the non-application keys and each of the non-application certificates are associated with at least two applications of the plurality of applications;

determine whether the application has permission to retrieve the key from the secure area of the non-application specific directory, if the key is found in the secure area of the non-application specific directory;

retrieve the key from the secure area of the non-application specific directory, if the application has permission to retrieve the key from the secure area of the non-application specific directory;

search for the key in a non-secure area of the non-application specific directory, if the key is not found in the secure area of the non-application specific directory; and retrieve the key from the non-secure area of the non-application specific directory, if the key is found in the non-secure area of the non-application specific directory.

* * * * *